(12) United States Patent
Gross et al.

(10) Patent No.: US 9,860,051 B2
(45) Date of Patent: Jan. 2, 2018

(54) METHOD AND APPARATUS FOR MANAGEMENT OF FREQUENCY-DIVISION-DUPLEX AND TIME-DIVISION-DUPLEX CARRIER AGGREGATION

(71) Applicant: NOKIA SOLUTIONS AND NETWORKS OY, Espoo (FI)

(72) Inventors: Jonathan Gross, Gilbert, AZ (US); Vivek Naik, Deerfield, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 4 days.

(21) Appl. No.: 14/605,477

(22) Filed: Jan. 26, 2015

(65) Prior Publication Data
US 2016/0218850 A1 Jul. 28, 2016

(51) Int. Cl.
*H04W 72/04* (2009.01)
*H04L 5/14* (2006.01)
*H04L 5/00* (2006.01)
*H04W 24/10* (2009.01)

(52) U.S. Cl.
CPC ............... *H04L 5/14* (2013.01); *H04L 5/001* (2013.01); *H04L 5/006* (2013.01); *H04L 5/0058* (2013.01); *H04W 24/10* (2013.01); *H04W 72/0453* (2013.01)

(58) Field of Classification Search
CPC .... H04B 7/0639; H04B 7/0456; H04B 7/063; H04B 7/0671; H04B 7/0469
USPC ....................................... 370/280; 455/553.1
See application file for complete search history.

(56) References Cited

U.S. PATENT DOCUMENTS

| 6,845,238 | B1 | 1/2005 | Muller |
| 9,538,439 | B2 * | 1/2017 | Pica ...................... H04W 36/14 |
| 2002/0075939 | A1 * | 6/2002 | Zeira ................... H04W 52/225 375/130 |
| 2007/0248043 | A1 | 10/2007 | Afrashteh et al. |
| 2010/0022190 | A1 * | 1/2010 | Laroia .................. H04W 40/12 455/67.11 |

(Continued)

FOREIGN PATENT DOCUMENTS

WO  2013/045980 A1  4/2013
WO  2014209049 A1  12/2014

OTHER PUBLICATIONS

Jeanette Wannstrom, "Carrier Aggregation explained", The Mobile Broadband Standard, http://www.3gpp.org/technologies/keywords-acronyms/101-carrier-aggregation-explained, Jun. 2013, pp. 1-6.
"NSN, KT, SKT achieve world's first TDD-FDD carrier aggregation demonstration", http://networks.nokia.com/news-events/press-room/press-releases/nsn-kt-skt-achieve-worlds-first-tdd-fdd-carrier-aggregation-demonstration, Seoul, Korea, Feb. 24, 2014, pp. 1-3.

(Continued)

*Primary Examiner* — Edan Orgad
*Assistant Examiner* — Emmanuel Maglo
(74) *Attorney, Agent, or Firm* — Squire Patton Boggs (US) LLP

(57) ABSTRACT

A method and apparatus may predict a link quality. The method may also include determining a primary cell for a user equipment based on the predicted link quality. The determining the primary cell comprises determining whether the user equipment should be served by a time-division-duplex carrier or by a frequency-division-duplex carrier. The method may also include determining a carrier aggregation to be used by the user equipment based on the predicted link quality.

16 Claims, 7 Drawing Sheets

(56) References Cited

U.S. PATENT DOCUMENTS

| | | | |
|---|---|---|---|
| 2012/0086767 A1* | 4/2012 | Lau | H04N 7/148 348/14.02 |
| 2013/0295989 A1* | 11/2013 | Smadi | H04W 72/1215 455/553.1 |
| 2013/0315085 A1* | 11/2013 | Krishnamurthy | H04L 5/001 370/252 |
| 2014/0010170 A1 | 1/2014 | Das et al. | |
| 2014/0293893 A1* | 10/2014 | Papasakellariou | H04W 72/04 370/329 |
| 2015/0036666 A1* | 2/2015 | Blankenship | H04W 72/044 370/336 |
| 2015/0230224 A1* | 8/2015 | Maaref | H04W 72/0406 455/451 |
| 2015/0264620 A1* | 9/2015 | Timus | H04W 36/32 455/440 |
| 2015/0327198 A1* | 11/2015 | Axmon | H04W 56/0045 370/336 |
| 2016/0081033 A1* | 3/2016 | Ouchi | H04W 52/146 455/522 |
| 2016/0198455 A1* | 7/2016 | Caretti | H04W 76/023 370/329 |

OTHER PUBLICATIONS

3GPP TR 36.847 V12.0.0 (Dec. 2013), "Technical Specification Group Radio Access Network; Study on LTE Time Division Duplex (TDD)—Frequency Division Duplex (FDD) joint operation including Carrier Aggregation (CA)", Release 12, p. 7.

eLTE2.3 DBS3900 LTE TDD, "Basic Feature Description", Huawei, Feb. 10, 2014, Chapter 2, pp. 19-21.

"Nokia Networks, China Telecom mark major milestone in FDD-TDD carrier aggregation", http://networks.nokia.com/news-events/press-room/press-releases/nokia-networks-china-telecom-mark-major-milestone-in-fdd-tdd-carrier-aggregation, Sep. 3, 2014, pp. 1-3.

Extended European Search Report dated Jun. 3, 2016, issued in corresponding European Application No. 16152506.8, 9 pages.

Ericsson, 3GPP TSG RAN WG1 Meeting #75 R1-135649, "HARQ feedback and PUCCH design for TDD-FDD CA", San Francisco, USA, Nov. 11-15, 2013, 4 pages.

* cited by examiner

METHOD AND APPARATUS FOR MANAGEMENT OF FREQUENCY-DIVISION-DUPLEX AND TIME-DIVISION-DUPLEX CARRIER AGGREGATION

BACKGROUND

Field

Embodiments of the invention relate to implementing management of frequency-division-duplex and time-division-duplex carrier aggregation.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may comprise predicting a link quality. The method may also comprise determining a primary cell for a user equipment based on the predicted link quality. The determining the primary cell comprises determining whether the user equipment should be served by a time-division-duplex carrier or by a frequency-division-duplex carrier. The method may also comprise determining a carrier aggregation to be used by the user equipment based on the predicted link quality.

In the method of the first embodiment, the method further comprises determining an uplink capacity. The determining the primary cell further comprises determining the primary cell based on the uplink capacity, and the determining the carrier aggregation further comprises determining the carrier aggregation based on the uplink capacity.

In the method of the first embodiment, the determining the carrier aggregation to be used by the user equipment comprises determining whether the user equipment should use time-division-duplex-only carrier aggregation or frequency-division-duplex-and-time-division-duplex carrier aggregation.

In the method of the first embodiment, the predicting the link quality comprises determining a reliability of time-division-duplex downlink and a reliability of time-division-duplex uplink.

In the method of the first embodiment, if both time-division-duplex downlink and time-division-duplex uplink are determined to be reliable, then the user equipment is determined to be served by the time-division-duplex carrier, and the user equipment is determined to use time-division-duplex-only carrier aggregation. If time-division-duplex downlink is determined to be reliable and time-division-duplex uplink is determined to be unreliable, then the user equipment is determined to be served by the frequency-division-duplex carrier, and the user equipment is determined to use frequency-division-duplex-and-time-division-duplex carrier aggregation.

In the method of the first embodiment, the predicting comprises measuring a physical-uplink-shared-channel signal-to-interference-plus-noise-ratio measurement, and the measurement corresponds to a difference in signal-to-interference-plus-noise-ratio when the user equipment switches its primary cell from a frequency-division-duplex carrier to a time-division-duplex carrier.

In the method of the first embodiment, the predicting comprises predicting the link quality based on a frequency-division-duplex pathloss adjusted by a pathloss difference between a time-division-duplex carrier and a frequency-division-duplex carrier.

In the method of the first embodiment, the predicting comprises using thresholds that are determined based on a type of service in use.

In the method of the first embodiment, delay-sensitive traffic for a service is delivered on the frequency-division-duplex carrier and delay-tolerant traffic is delivered on both the time-division-duplex carrier and the frequency-division-duplex carrier.

In the method of the first embodiment, the predicting the link quality comprises estimating a time-division-duplex uplink link quality based on the pathloss difference, further accounting an interference-level-over-thermal difference between the time-division-duplex carrier and the frequency-division-duplex carrier.

According to a second embodiment, an apparatus comprises at least one processor. The apparatus may also comprise at least one memory including computer program code. The at least one memory and the computer program code may be configured, with the at least one processor, to cause the apparatus at least to predict a link quality. The apparatus may also be caused to determine a primary cell for a user equipment based on the predicted link quality. The determining the primary cell comprises determining whether the user equipment should be served by a time-division-duplex carrier or by a frequency-division-duplex carrier. The apparatus may also be caused to determine a carrier aggregation to be used by the user equipment based on the predicted link quality.

In the apparatus of the second embodiment, the apparatus is further caused to determine an uplink capacity, the determining the primary cell further comprises determining the primary cell based on the uplink capacity, and the determining the carrier aggregation further comprises determining the carrier aggregation based on the uplink capacity.

In the apparatus of the second embodiment, the determining the carrier aggregation to be used by the user equipment comprises determining whether the user equipment should use time-division-duplex-only carrier aggregation or frequency-division-duplex-and-time-division-duplex carrier aggregation.

In the apparatus of the second embodiment, the predicting the link quality comprises determining a reliability of time-division-duplex downlink and a reliability of time-division-duplex uplink.

In the apparatus of the second embodiment, if both time-division-duplex downlink and time-division-duplex uplink are determined to be reliable, then the user equipment is determined to be served by the time-division-duplex carrier, and the user equipment is determined to use time-division-duplex-only carrier aggregation. If time-division-duplex downlink is determined to be reliable and time-division-duplex uplink is determined to be unreliable, then the user equipment is determined to be served by the frequency-division-duplex carrier, and the user equipment is determined to use frequency-division-duplex-and-time-division-duplex carrier aggregation.

In the apparatus of the second embodiment, the predicting comprises measuring a physical-uplink-shared-channel signal-to-interference-plus-noise-ratio measurement, and the measurement corresponds to a difference in signal-to-interference-plus-noise-ratio when the user equipment switches its primary cell from a frequency-division-duplex carrier to a time-division-duplex carrier.

In the apparatus of the second embodiment, the predicting comprises predicting the link quality based on a frequency-division-duplex pathloss adjusted by a pathloss difference between a time-division-duplex carrier and a frequency-division-duplex carrier.

In the apparatus of the second embodiment, the predicting comprises using thresholds that are determined based on a type of service in use.

In the apparatus of the second embodiment, delay-sensitive traffic for a service is delivered on the frequency-division-duplex carrier and delay-tolerant traffic is delivered on both the time-division-duplex carrier and the frequency-division-duplex carrier.

In the apparatus of the second embodiment, the predicting the link quality comprises estimating a time-division-duplex uplink link quality based on the pathloss difference, further accounting an interference-level-over-thermal difference between the time-division-duplex carrier and the frequency-division-duplex carrier.

According to a third embodiment, a computer program product may be embodied on a non-transitory computer readable medium. The computer program product may be configured to control a processor to perform a process, comprising predicting a link quality. The process may also include determining a primary cell for a user equipment based on the predicted link quality. The determining the primary cell comprises determining whether the user equipment should be served by a time-division-duplex carrier or by a frequency-division-duplex carrier. The process may also include determining a carrier aggregation to be used by the user equipment based on the predicted link quality.

In the computer program product of the third embodiment, the process may further comprise determining an uplink capacity, the determining the primary cell further comprises determining the primary cell based on the uplink capacity, and the determining the carrier aggregation further comprises determining the carrier aggregation based on the uplink capacity.

According to a fourth embodiment, an apparatus may comprise predicting means for predicting a link quality. The apparatus may also comprise first determining means for determining a primary cell for a user equipment based on the predicted link quality. The determining the primary cell comprises determining whether the user equipment should be served by a time-division-duplex carrier or by a frequency-division-duplex carrier. The apparatus may also comprise second determining means for determining a carrier aggregation to be used by the user equipment based on the predicted link quality.

In the apparatus of the fourth embodiment, the apparatus further comprises third determining means for determining an uplink capacity. The determining the primary cell further comprises determining the primary cell based on the uplink capacity, and the determining the carrier aggregation further comprises determining the carrier aggregation based on the uplink capacity.

In the apparatus of the fourth embodiment, the determining the carrier aggregation to be used by the user equipment comprises determining whether the user equipment should use time-division-duplex-only carrier aggregation or frequency-division-duplex-and-time-division-duplex carrier aggregation.

In the apparatus of the fourth embodiment, the predicting the link quality comprises determining a reliability of time-division-duplex downlink and a reliability of time-division-duplex uplink.

In the apparatus of the fourth embodiment, if both time-division-duplex downlink and time-division-duplex uplink are determined to be reliable, then the user equipment is determined to be served by the time-division-duplex carrier, and the user equipment is determined to use time-division-duplex-only carrier aggregation. If time-division-duplex downlink is determined to be reliable and time-division-duplex uplink is determined to be unreliable, then the user equipment is determined to be served by the frequency-division-duplex carrier, and the user equipment is determined to use frequency-division-duplex-and-time-division-duplex carrier aggregation.

In the apparatus of the fourth embodiment, the predicting comprises measuring a physical-uplink-shared-channel signal-to-interference-plus-noise-ratio measurement, and the measurement corresponds to a difference in signal-to-interference-plus-noise-ratio when the user equipment switches its primary cell from a frequency-division-duplex carrier to a time-division-duplex carrier.

In the apparatus of the fourth embodiment, the predicting comprises predicting the link quality based on a frequency-division-duplex pathloss adjusted by a pathloss difference between a time-division-duplex carrier and a frequency-division-duplex carrier.

In the apparatus of the fourth embodiment, the predicting comprises using thresholds that are determined based on a type of service in use.

In the apparatus of the fourth embodiment, delay-sensitive traffic for a service is delivered on the frequency-division-duplex carrier and delay-tolerant traffic is delivered on both the time-division-duplex carrier and the frequency-division-duplex carrier.

In the apparatus of the fourth embodiment, the predicting the link quality comprises estimating a time-division-duplex uplink link quality based on the pathloss difference, further accounting an interference-level-over-thermal difference between the time-division-duplex carrier and the frequency-division-duplex carrier.

BRIEF DESCRIPTION OF THE DRAWINGS

For proper understanding of the invention, reference should be made to the accompanying drawings, wherein.

DETAILED DESCRIPTION

Certain embodiments of the invention relate to implementing management of frequency-division-duplex and time-division-duplex (FDD-TDD) carrier aggregation. Certain embodiments of the present invention may be directed to a method for selecting a type of carrier by predicting a link quality of TDD (for the UE being served by an FDD carrier), and for allocating resources (such as configuring FDD and TDD CA versus configuring TDD-only CA). Certain embodiments of the present invention may determine TDD UL capability based on FDD carrier measurements (by adjusting the FDD measurements by a frequency-band-dependent pathloss offset). Certain embodiments of the present invention may determine TDD UL capability from FDD carrier measurements by maintaining a historical/filtered set of measurements for both FDD and TDD carrier uplinks, and certain embodiments of the present invention may use the difference between the measurements to predict the TDD UL SINR if TDD is selected as the Pcell.

One of LTE-Advanced's (LTE-A's) features is the ability to aggregate carriers, such as both intra-band and inter-band carriers. Carriers can be aggregated in order to increase downlink throughput and capacity. This capability was introduced in LTE Release 10. Certain embodiments of the present invention may be applicable to systems with multi-band overlapping deployments, such as LTE-A systems, for example. Such systems may be used to carry multimedia data, voice data, and/or any other types of traffic.

Figure 1:
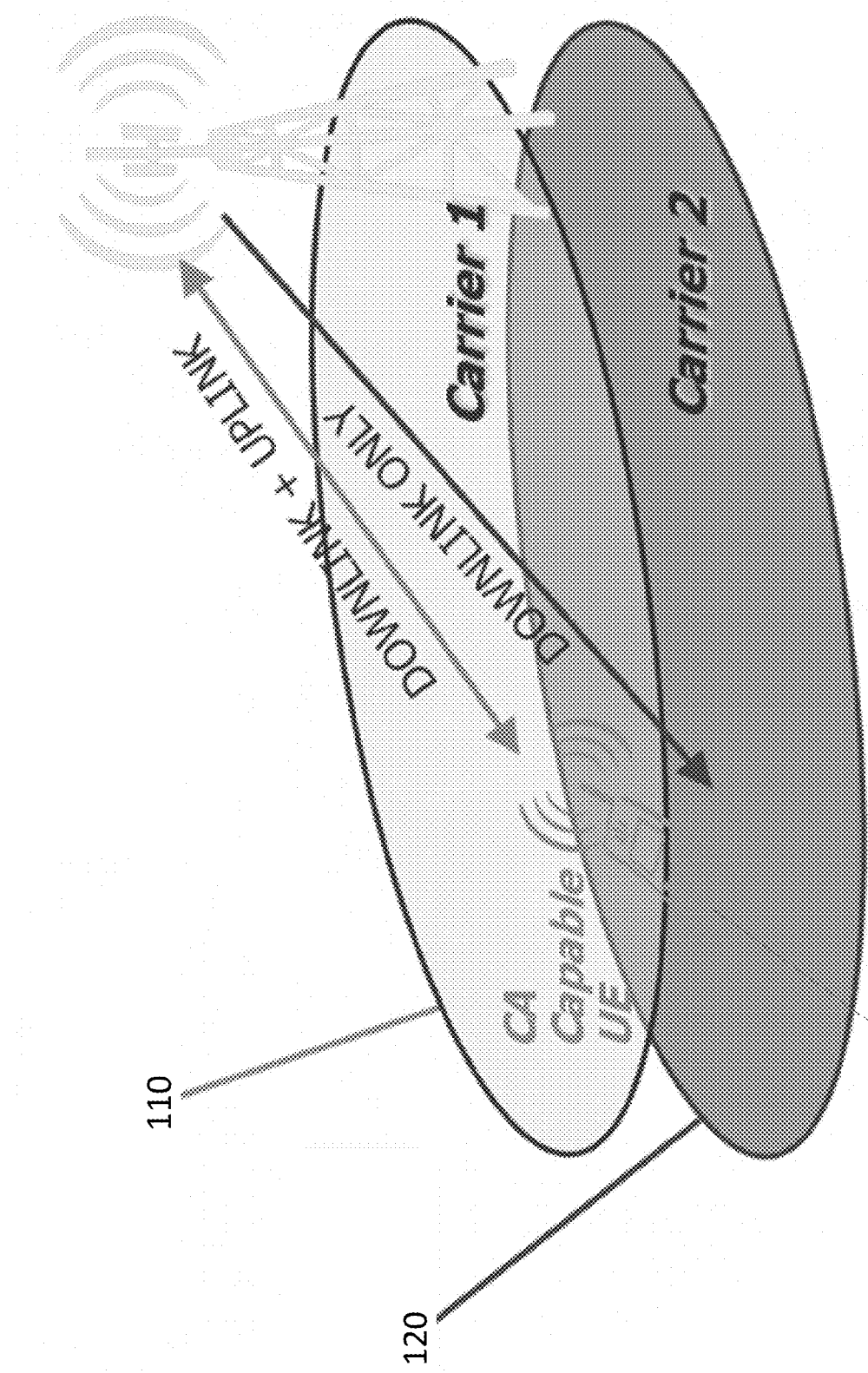
FIG. 1 illustrates fundamentals of certain examples of downlink carrier aggregation.

FIG. 1 illustrates fundamentals of certain examples of downlink carrier aggregation. With downlink carrier aggregation (CA), for a given user equipment (UE) 100, there may be a single corresponding primary cell (P-cell) 110 and one or more corresponding secondary cells (S-cell(s)) 120. The carriers/cells that are aggregated/combined to provide downlink (DL) traffic to the UE 100 are also referred to as component carriers (CC). The S-cells 120 may provide additional downlink bandwidth to the UE 100 because downlink traffic can be simultaneously scheduled on both the P-cell 110 and the one or more S-cells 120.

Such scheduling of downlink traffic may greatly increase the maximum downlink throughput capability. Activation of secondary cells (S-cell(s)) may provide additional downlink bandwidth. On the uplink (UL), the cell that is assigned as the P-cell (and the corresponding frequency band) may be used to carry all uplink traffic for the UE.

LTE Release 12 introduces the capability to perform carrier aggregation across both Frequency-Division-Duplex (FDD) and Time-Division-Duplex (TDD) carriers. This capability allows operators to maximize the downlink throughput and coverage across multiple frequency and technology layers.

Operators may seek to utilize this technology, for example, to allow greater usage of DL TDD spectrum at 2.5 GHz, where propagation losses are generally larger. The operator may also utilize the FDD uplink (UL) at 800 MHz or 1.9 GHz, where propagation losses are generally smaller. The operator may use this technology to provide sufficient UL coverage (such as by using the FDD layer) to allow DL TDD carrier aggregation (where a substantial amount of 2.5 GHz spectrum is available) to improve downlink throughput performance and capacity for the operator's subscribers. Similar plans to pair overlaying FDD (from a lower band) with TDD (from a higher 3.5 GHz spectrum) may be applicable when 3.5 GHz is auctioned across various countries.

Figure 2:
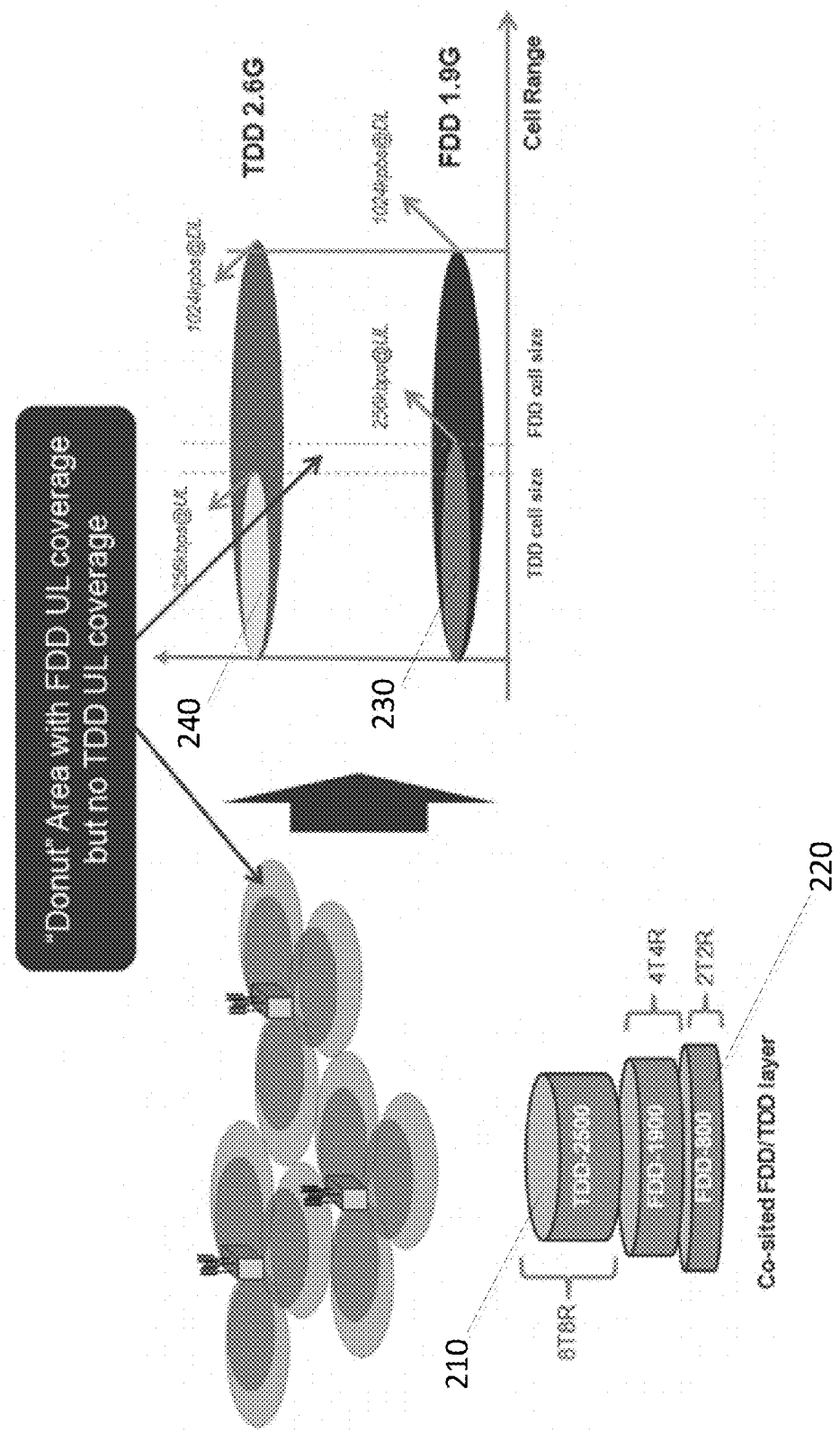
FIG. 2 illustrates a difference in coverage between certain examples of multiple-frequency bands.

FIG. 2 illustrates a difference in coverage between certain examples of multiple-frequency bands. Specifically, FIG. 2 illustrates an example of multiple band DL/UL coverage. One technical difficulty relating to multi-layer deployments across multiple frequency bands relates to managing the traffic allocation and traffic distribution across these layers.

This difficulty may be particularly relevant to FDD-TDD CA deployments. It may be desirable to utilize TDD DL resources for as many UEs as possible in order to maximize a performance benefit gained from using available TDD bandwidth in the higher frequency bands. It may be important to preserve and prioritize the use of the FDD UL, in view of the limited amount of available bandwidth and spectrum, and in view of the importance of ensuring overall coverage for as many subscribers as possible when using the lower frequency band. This prioritization may become important when real-time services like Voice-over-LTE (VoLTE) become widely used. The above-described technical difficulties may be addressed by certain embodiments of the present invention, as described in more detail below.

LTE operators demand the highest possible LTE throughputs and capacities, and the LTE operators are interested in using carrier aggregation, introduced by LTE-A, to provide this peak downlink throughput. Almost every operator may be engaged in a "peak throughput" race, which may be crucial to their marketing campaigns. A key component in winning this race may be the introduction of more and more carrier aggregation capability.

As described above, LTE Release 12 introduces aggregation of FDD and TDD carriers. FDD and TDD Carrier Aggregation capability is of particular interest to many operators with significant TDD spectrum 210 in higher frequency bands (e.g., 2.5 GHz or 3.5 GHz), and to operators with limited FDD spectrum 220 in lower frequency bands (e.g., 800 MHz or 1900 MHz).

Referring to FIG. 2, there may be a coverage region that is referred to as the "donut area." In this "donut area" coverage region, UEs generally have UL coverage in FDD 230 but not in TDD 240, while having DL coverage in both FDD and TDD bands. UEs will generally have UL coverage in both FDD and TDD bands closer to the evolved Node B (eNB). If all UEs are eligible for carrier aggregation, and if these UEs utilize FDD and TDD Carrier Aggregation, then the FDD uplink can be easily overloaded. In view of the above, lower frequencies may allow FDD UL to go further than TDD UL. FDD-TDD CA may extend the effective area of TDD DL.

Figure 3:
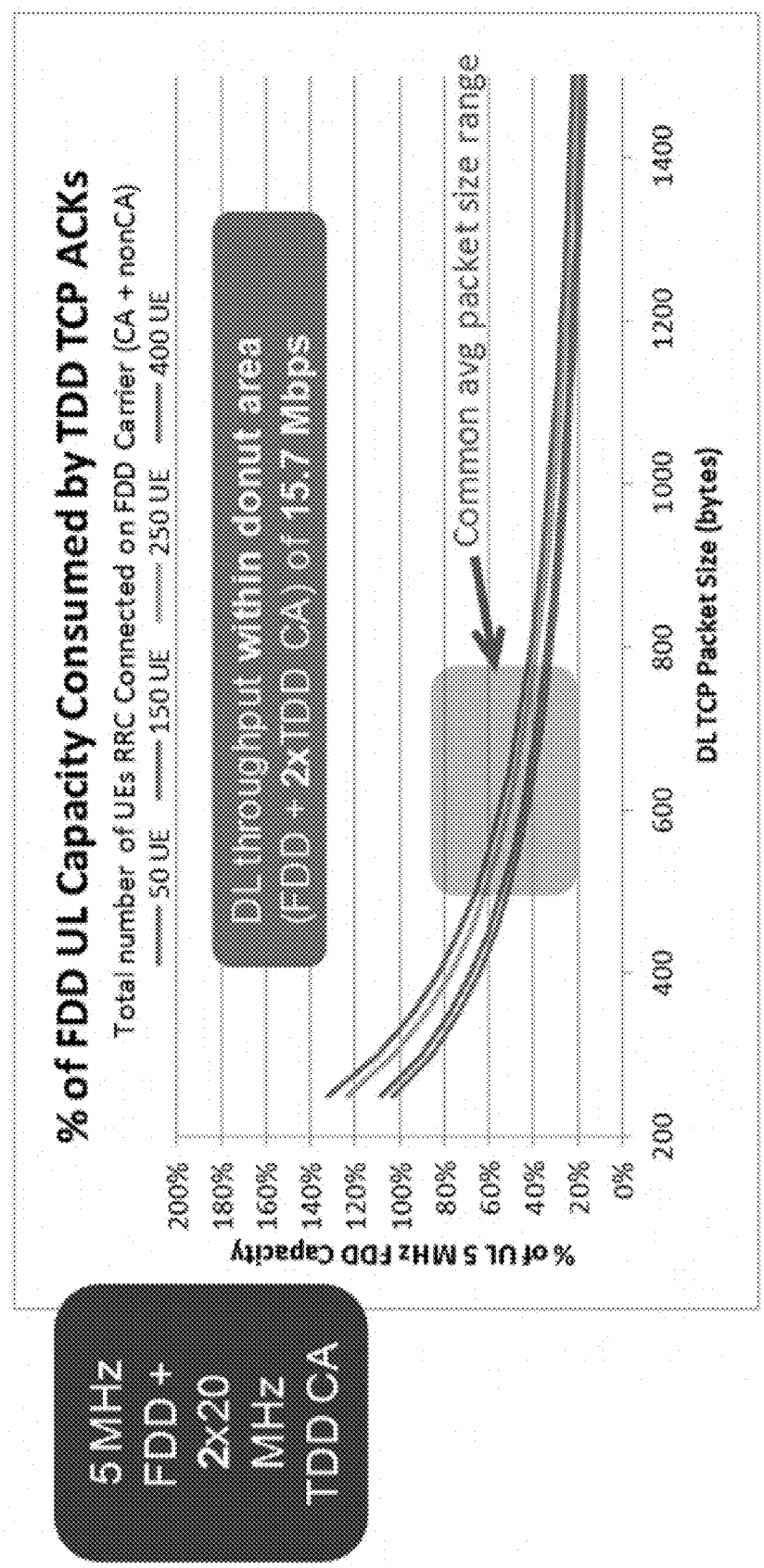
FIG. 3 illustrates an example of a load on frequency-division duplex (FDD) uplink.
Figure 4:
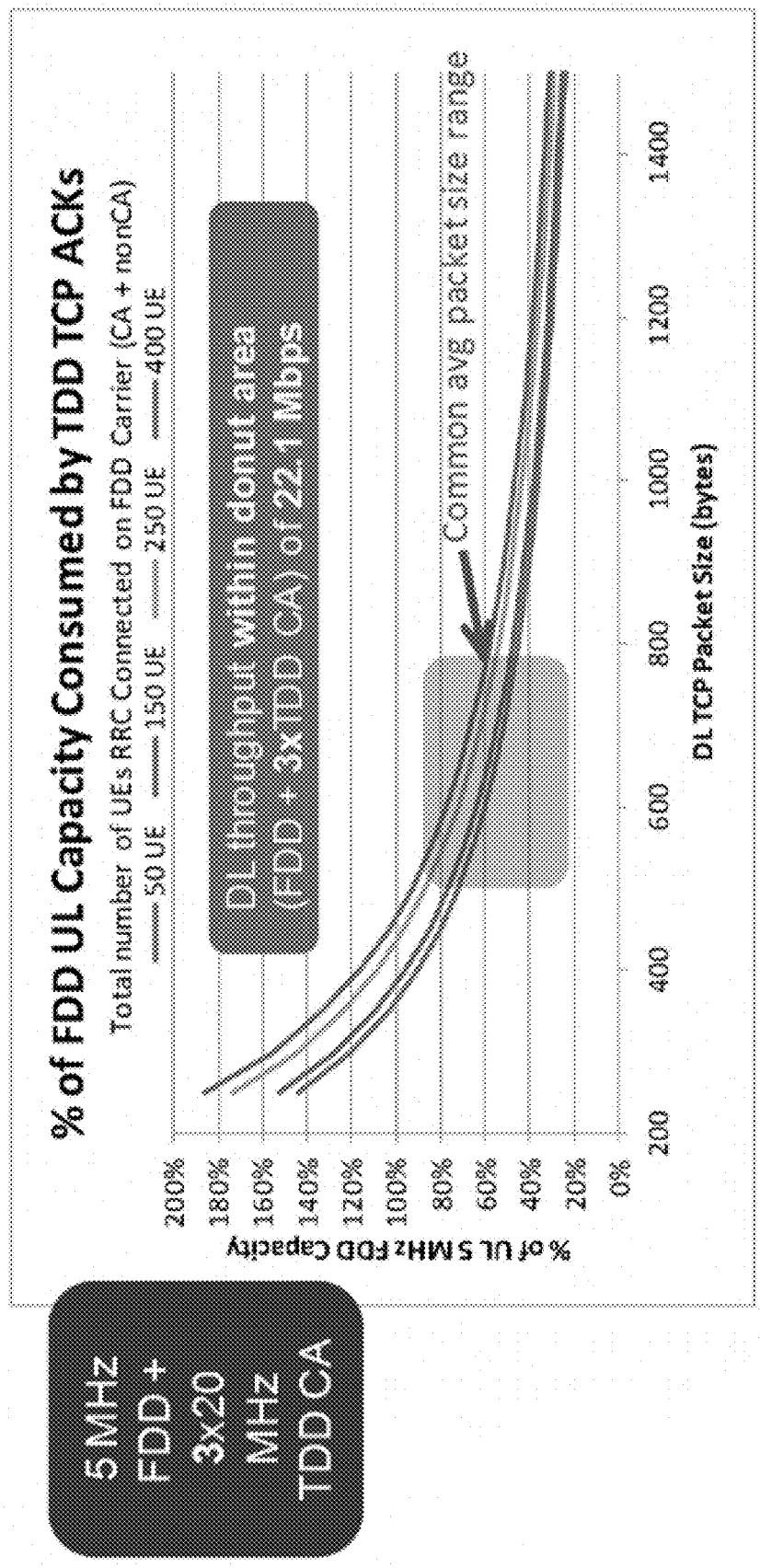
FIG. 4 illustrates another example of a load on FDD uplink.

FIG. 3 illustrates an example of a load on FDD uplink. FIG. 4 illustrates another example of a load on FDD uplink. The load may result from the Transmission-Control-Protocol (TCP) ACK traffic corresponding to the TDD downlink. Technical difficulties to resolve may relate to the management of which UEs are placed in which band. Technical difficulties may also relate to which carrier/cell is allocated as the P-cell (as described above). Technical difficulties may also relate to which UEs are allowed to perform FDD and TDD carrier aggregation.

FIGS. 3 and 4 illustrate FDD 5 MHz UL capacity demand (resulting from TCP ACKs) resulting from user equipment (UEs) in a donut area using FDD and TDD Carrier Aggregation (CA). FIG. 3 illustrates a scenario where the UE uses, for example, 2 component-carrier (CC) CA. Each CC may use a 20 MHz bandwidth, for a total of 40 MHz of bandwidth available to the UE. FIG. 4 illustrates a scenario where the UE uses, for example, 3 component-carrier (CC) CA. Each CC may use a 20 MHz bandwidth, for a total of 60 MHz of bandwidth available to the UE. As illustrated by FIG. 4, the DL throughput (within the donut area) may be 22.1 Mbps. As illustrated by FIG. 3, the DL throughput (within the donut area) may be 15.7 Mbps. As described below, certain embodiments of the present invention may provide efficient allocation of multi-layer spectrum resources, including the management of when to use FDD and TDD CA versus using TDD-only CA.

Certain embodiments of the present invention may augment the type of service requested by UE in addition to the above measurement criterias to determine the trigger to enter into FDD and TDD CA. The lower band FDD carrier may serve as a P-Cell for a UE and may carry the high priority or delay sensitive traffic for the UE. The upper band TDD carrier may serve as an S-Cell for lower priority or delay tolerant traffic.

Certain embodiments of the present invention may measure and predict both uplink quality and uplink capacity. The measurements may be performed when determining when and whether an upper band TDD carrier or a lower band FDD carrier will serve as a P-Cell for a UE. Certain embodiments of the present invention also determine, secondly, if the UE should be CA configured or activated based on these measurements and predictions.

Certain embodiments of the present invention may also augment the prediction of UL quality on one or both of the FDD and TDD carriers. The prediction of UL quality may be augmented using historical uplink Signal-to-Interference-plus-noise ratio (SINR) measurements within the multiple frequency bands.

Certain embodiments of the present invention may use both DL and UL measurements to determine when a UE should be served by a TDD (upper band) carrier, where the TDD (upper band) carrier acts as the UE's serving cell (and P-cell when CA activated). The DL and UL measurements may be used to determine a link quality, as described in more detail below. Certain embodiments of the present invention also determine when to utilize TDD-only DL carrier aggregation.

Certain embodiments of the present invention may also use both DL and UL measurements to determine when a UE should be served by a FDD (lower band) carrier, where the FDD (lower band) carrier acts as the UE's serving cell (and P-cell when CA activated). Certain embodiments of the present invention also determine when to utilize FDD and TDD carrier aggregation.

One example method for band allocation is described as follows. This method for band allocation may determine which of TDD-only or TDD-FDD carrier aggregation is to be utilized. If both TDD DL and UL are reliable, then the UE is directed to the TDD band to be served by a TDD carrier, and the UE will use TDD-only CA. Because there is generally greater bandwidth availability in the TDD band, this also allows the UE to use, for example, 3 Component Carrier (CC) Carrier Aggregation (CA). Each CC may use a 20 MHz bandwidth, for a total of 60 MHz of DL TDD bandwidth available to the UE.

In certain embodiments of the invention, if the TDD DL is reliable, but the UL is not reliable, then the UE may be directed to the FDD band to be served by a FDD carrier, and the UE may use FDD and TDD CA. As such, the FDD carrier may be used to reliably transmit uplink traffic, while providing significant additional TDD bandwidth to the UE for downlink traffic.

Certain embodiments of the present invention may perform link-quality detection to determine the downlink and uplink reliability corresponding to the UE's Radio-Frequency conditions. The determined reliability may then be used in conjunction with the above-described allocation method.

For a UE that is served by a TDD carrier (such as a TDD P-cell, for example), the TDD uplink link quality may be determined via measurement of a Physical-Uplink-Shared Channel (PUSCH) SINR. The TDD downlink quality may be determined based upon: (1) a Reference-Signal-Received-Power (RSRP) measurement of the carrier that is provided by measurement reports, (2) a channel quality indicator (CQI) as reported by the UE for the TDD carrier(s), and/or (3) a Modulation and Coding Scheme (MCS) currently used for DL scheduling on the TDD carrier(s).

In certain embodiments of the invention, for a UE that is served by a FDD carrier (such as a FDD P-cell, for example), the UE will not be transmitting on the TDD carrier uplink. Therefore, the TDD carrier uplink quality is generally estimated before the P-cell can be changed from the FDD carrier to the TDD carrier, because all uplink traffic is to be carried on the Pcell. The TDD UL is to be estimated (and cannot be directly measured) because the UE is not transmitting on the TDD UL.

In certain embodiments of the invention, for a UE that is being served by a FDD carrier, the TDD uplink link quality may be estimated based upon a calculated FDD pathloss, adjusted by the estimated TDD versus FDD pathloss difference based on the carrier frequencies of the TDD carriers relative to the FDD carrier, and further accounting for the IoT (interference level over thermal) difference between the FDD and TDD carriers.

A power headroom report (PHR) may provide the transmit power that the UE used relative to its maximum transmit power (generally 23 dBm, but the transmit power can depend on the UE category). When the transmit power is used with the measured receive signal power, an estimate of the UL FDD pathloss may be determined. Alternatively, the pathloss can be estimated from measurement reports from the UE, which can provide the RSRP of the measured FDD (and/or TDD) carriers. The RSRP may then be used to calculate the DL pathloss, which is an estimate of the UL pathloss based on channel reciprocity.

The TDD versus FDD pathloss difference can be estimated from the difference in the TDD versus FDD carrier frequencies. If the estimated TDD pathloss+IoT(TDD) is less than or equal to a threshold, then the TDD UL may be considered to be reliable. Interference over thermal (IoT) refers to the interference that is present on the carrier's uplink. "IoT(TDD)" refers to the interference over thermal on the TDD carrier's uplink. The threshold may be determined based on a type of service in use.

In certain embodiments of the invention, for a UE being served by a FDD carrier, as decisions are made relating to switching the UE's Pcell from FDD to TDD, the difference in measured UL SINR when this switch occurs may be stored by the eNB. This stored difference in UL signal-to-interference-plus-noise ratio (SINR) (for any given UE), when the UE switches the UE's Pcell from FDD to TDD, may be filtered and used to predict the change in UL SINR when deciding whether to switch additional UEs P-cell from FDD to TDD. Estimated UL SINR (TDD) corresponds to Measured UL SINR (FDD)+TDD_FDD_SINR_OFFSET, where TDD_FDD_SINR_OFFSET corresponds to the filtered historical value as defined above. With this method, if the Estimated UL SINR (TDD) is greater than or equal to a threshold, then the TDD UL may be considered reliable.

The TDD downlink quality may be determined based on the RSRQ (or RSRP) measurement of the TDD carrier provided by measurement reports. If the RSRQ (or RSRP) is greater than or equal to a threshold, then the TDD DL may be considered to be reliable. As described above, thresholds may be determined based on the type of service in use.

With certain embodiments of the present invention, a concern may relate to the UL reliability of both the FDD and TDD carriers (as illustrated by FIG. 2). Certain embodiments of the present invention may determine UL reliability and quality. The determination of DL reliability may be optional.

Certain embodiments of the invention may additionally incorporate an estimate of the impact on uplink capacity resulting from activating CA for a UE that has a FDD UL carrier (where the FDD UL carrier generally has less total bandwidth or spectrum available) as its Pcell. Certain embodiments of the present invention may use this estimated impact to determine whether or not CA should be activated. If the FDD UL carrier has available capacity, then the thresholds may be automatically adjusted to vector more UEs so that the FDD carrier acts as their P-cell and to utilize FDD and TDD carrier aggregation. If the available FDD UL carrier capacity is low (with little available UL capacity on the FDD carrier), then the thresholds may be automatically adjusted to vector less UEs to the FDD carrier (as the Pcell), and instead to utilize TDD only carrier aggregation. This approach may automatically prevent overloading of the FDD uplink.

With certain embodiments of the present invention, estimated UL SINR capability of the UE may be used as an indicator of UL quality. TDD UL capability may be calculated from FDD carrier measurements by adjusting the FDD measurement by a frequency-band-dependent-pathloss offset.

Certain embodiments of the present invention may calculate TDD UL capability from FDD carrier measurements by maintaining a historical/filtered set of measurements for both FDD and TDD carrier uplinks Certain embodiments of the present invention may use the difference between them to predict the TDD UL SINR if TDD is selected as the Pcell. Certain embodiments of the present invention may use RSRP measurements to compute DL/UL pathloss. RSRP measurements may be used as an indicator of UL (or DL) quality. Certain embodiments of the present invention may use current or average MCS as an indicator of DL quality. Certain embodiments of the present invention may use CQI as an indicator of DL quality. Certain embodiments of the present invention may also use block (or bit) error rate (BLER) as an indicator of UL or DL quality. Certain embodiments of the present invention may or may not use carrier available capacity to determine how aggressively to vector UEs so that FDD (versus TDD) acts as their serving cell (P-cell).

With certain embodiments of the present invention, a Centralized-Self-Organizing-Network (CSON) may manage the biasing of traffic between frequency layers. The CSON may also manage the relative usage of FDD and TDD CA versus TDD-only CA, in view of setting the appropriate above-described thresholds.

Certain embodiments of the present invention may have significant commercial value because they may be applicable to multi-layer/multi-band carrier aggregation systems. Certain embodiments of the present invention may enable more efficient use of spectrum holdings. Certain embodiments of the present invention may allow higher downlink throughput and greater reliability to the end user, which can be favorable for important key performance indicators (KPIs).

Figure 5:
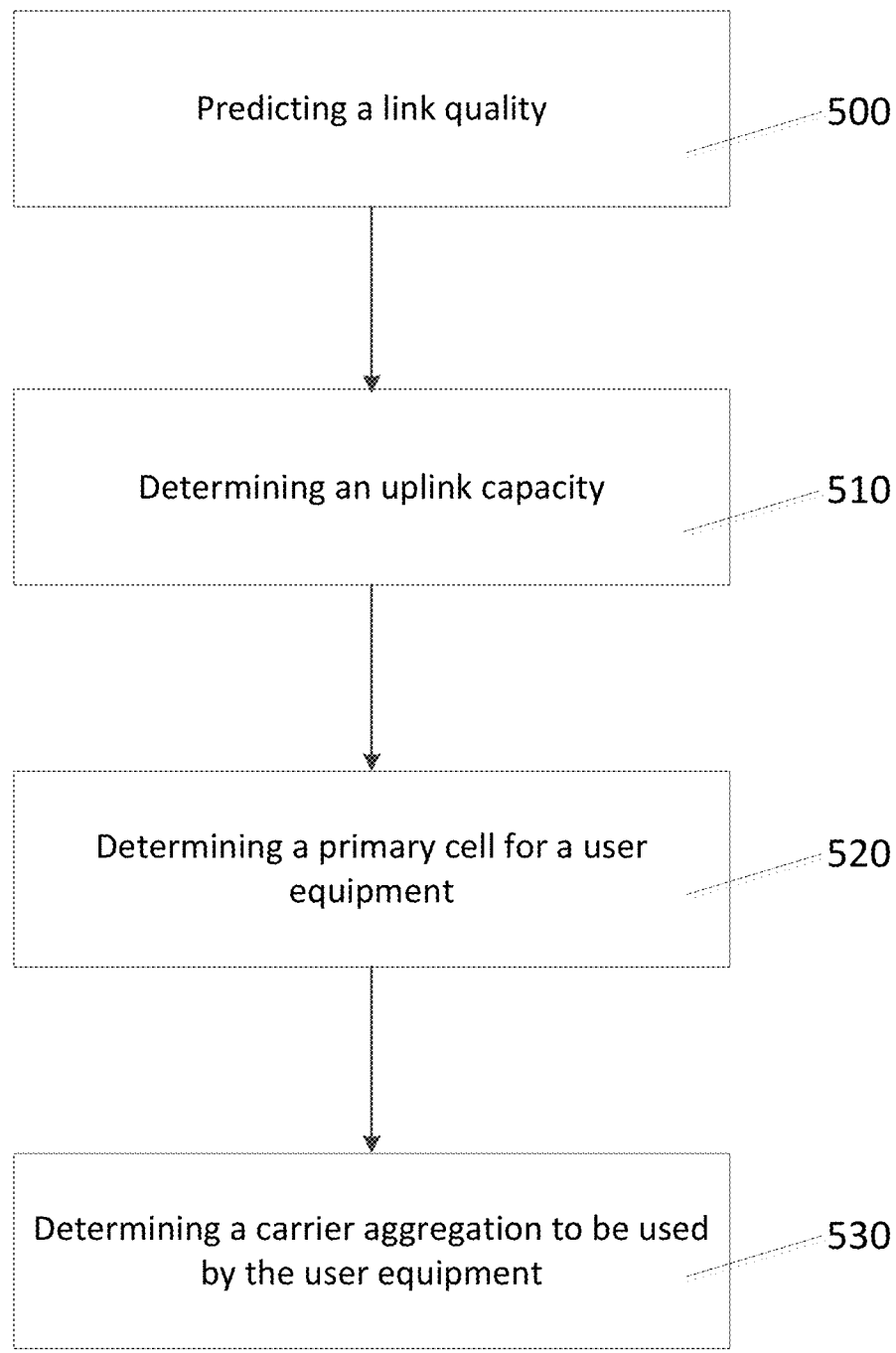
FIG. 5 illustrates a flowchart of a method in accordance with certain embodiments of the invention.

FIG. 5 illustrates a flowchart of a method in accordance with certain embodiments of the invention. The method illustrated in FIG. 5 comprises, at 500, predicting a link quality. In certain embodiments, the method may also include, at 510, determining an uplink capacity. However, other embodiments may not include the step of determining an uplink capacity. The method may also include, at 520, determining a primary cell for a user equipment based on the predicted link quality and/or the uplink capacity. The determining the primary cell comprises determining whether the user equipment should be served by a time-division-duplex carrier or by a frequency-division-duplex carrier. The method may also include, at 530, determining a carrier aggregation to be used by the user equipment based on the predicted link quality and/or the uplink capacity.

Figure 6:
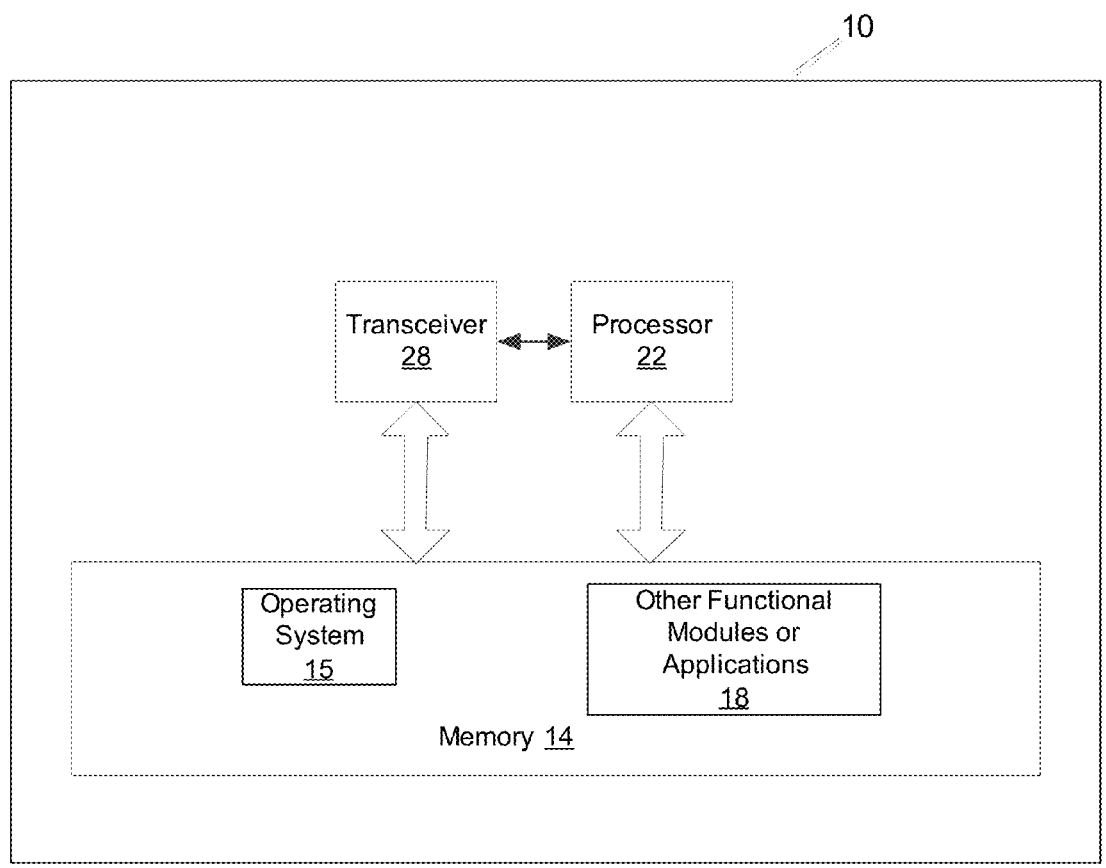
FIG. 6 illustrates an apparatus in accordance with certain embodiments of the invention.

FIG. 6 illustrates an apparatus in accordance with certain embodiments of the invention. In one embodiment, the apparatus can be a network element, such as a user equipment or a base station, for example. Apparatus 10 can include a processor 22 for processing information and executing instructions or operations. Processor 22 can be any type of general or specific purpose processor. While a single processor 22 is shown in FIG. 6, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 7:
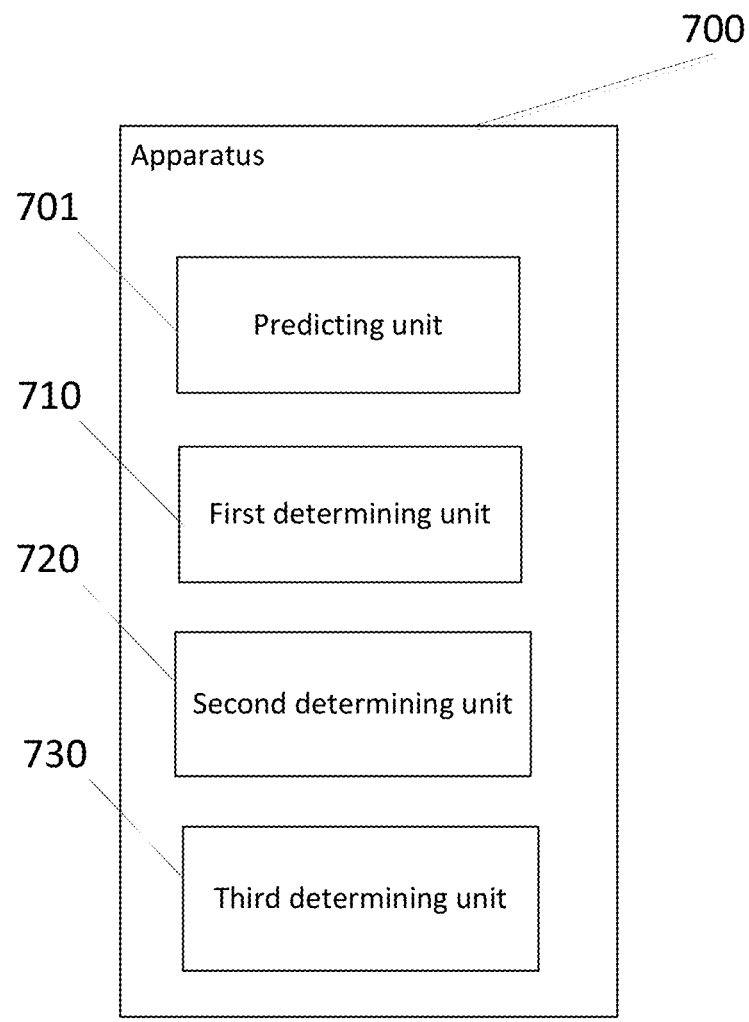
FIG. 7 illustrates an apparatus in accordance with certain embodiments of the invention.

FIG. 7 illustrates an apparatus in accordance with certain embodiments of the invention. Apparatus 700 can be a network element/entity such as a base station and/or an evolved Node B, for example. Apparatus 700 can include a predicting unit 701 that predicts a link quality. In certain embodiments, apparatus 700 can also include a first determining unit (or means) 710 that determines an uplink capacity. Other embodiments may not be configured to determine the uplink capacity. Apparatus 700 may also include a second determining unit (or means) 720 that determines a primary cell for a user equipment based on the predicted link quality and/or the uplink capacity. The determining the primary cell comprises determining whether the user equipment should be served by a time-division-duplex carrier or by a frequency-division-duplex carrier. Apparatus 700 may also include a third determining unit (or means) 730 that determines a carrier aggregation to be used by the user equipment based on the predicted link quality and/or the uplink capacity.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   predicting a link quality;
   determining a primary cell for a user equipment based on the predicted link quality, wherein the determining the primary cell comprises determining whether the user equipment should be served by a time-division-duplex carrier or by a frequency-division-duplex carrier;
   determining a carrier aggregation to be used by the user equipment based on the predicted link quality; and
   determining an uplink capacity corresponding to a total bandwidth or a spectrum availability,
   wherein the determining the primary cell further comprises determining the primary cell based on the uplink capacity,
   wherein the determining the carrier aggregation further comprises determining the carrier aggregation based on the uplink capacity, and
   wherein the predicting the link quality comprises determining a reliability of time-division-duplex downlink and a reliability of time-division-duplex uplink.

2. The method according to claim 1, wherein the determining the carrier aggregation to be used by the user equipment comprises determining whether the user equipment should use time-division-duplex-only carrier aggregation or frequency-division-duplex-and-time-division-duplex carrier aggregation.

3. The method according to claim 1, wherein the predicting comprises measuring a physical-uplink-shared-channel signal-to-interference-plus-noise-ratio measurement, and the measurement corresponds to a difference in signal-to-interference-plus-noise-ratio when the user equipment switches its primary cell from a frequency-division-duplex carrier to a time-division-duplex carrier.

4. The method according to claim 1, wherein the predicting comprises predicting the link quality based on a frequency-division-duplex pathloss adjusted by a pathloss difference between a time-division-duplex carrier and a frequency-division-duplex carrier.

5. The method according to claim 1, wherein the predicting comprises using thresholds that are determined based on a type of service in use.

6. The method according to claim 5, wherein delay-sensitive traffic for a service is delivered on the frequency-division-duplex carrier and delay-tolerant traffic is delivered on both the time-division-duplex carrier and the frequency-division-duplex carrier.

7. The method according to claim 1, wherein the predicting the link quality comprises estimating a time-division-duplex uplink link quality based on the pathloss difference, further accounting an interference-level-over-thermal difference between the time-division-duplex carrier and the frequency-division-duplex carrier.

8. A method, comprising:
   predicting a link quality;
   determining a primary cell for a user equipment based on the predicted link quality, wherein the determining the primary cell comprises determining whether the user equipment should be served by a time-division-duplex carrier or by a frequency-division-duplex carrier; and
   determining a carrier aggregation to be used by the user equipment based on the predicted link quality,
   wherein the predicting the link quality comprises determining a reliability of time-division-duplex downlink and a reliability of time-division-duplex uplink,
   wherein
   if both time-division-duplex downlink and time-division-duplex uplink are determined to be reliable, then the user equipment is determined to be served by the time-division-duplex carrier, and the user equipment is determined to use time-division-duplex-only carrier aggregation, and
   if time-division-duplex downlink is determined to be reliable and time-division-duplex uplink is determined to be unreliable, then the user equipment is determined to be served by the frequency-division-duplex carrier, and the user equipment is determined to use frequency-division-duplex-and-time-division-duplex carrier aggregation.

9. An apparatus, comprising:
   at least one processor; and
   at least one memory including computer program code,
   the at least one memory and the computer program code configured, with the at least one processor, to cause the apparatus at least to
   predict a link quality;
   determine a primary cell for a user equipment based on the predicted link quality, wherein the determining the primary cell comprises determining whether the user equipment should be served by a time-division-duplex carrier or by a frequency-division-duplex carrier;
   determine a carrier aggregation to be used by the user equipment based on the predicted link quality; and
   determine an uplink capacity corresponding to total bandwidth or a spectrum availability, wherein the determining the primary cell further comprises determining the primary cell based on the uplink capacity, wherein the determining the carrier aggregation further comprises determining the carrier aggregation based on the uplink capacity, and the predicting the link quality comprises determining a reliability of time-division-duplex downlink and a reliability of time-division-duplex uplink.

10. The apparatus according to claim 9, wherein the determining the carrier aggregation to be used by the user equipment comprises determining whether the user equipment should use time-division-duplex-only carrier aggregation or frequency-division-duplex-and-time-division-duplex carrier aggregation.

11. The apparatus according to claim 9, wherein the predicting comprises measuring a physical-uplink-shared-channel signal-to-interference-plus-noise-ratio measurement, and the measurement corresponds to a difference in signal-to-interference-plus-noise-ratio when the user equipment switches its primary cell from a frequency-division-duplex carrier to a time-division-duplex carrier.

12. The apparatus according to claim 9, wherein the predicting comprises predicting the link quality based on a frequency-division-duplex pathloss adjusted by a pathloss difference between a time-division-duplex carrier and a frequency-division-duplex carrier.

13. The apparatus according to claim 9, wherein the predicting comprises using thresholds that are determined based on a type of service in use.

14. The apparatus according to claim 9, wherein the predicting the link quality comprises estimating a time-division-duplex uplink link quality based on the pathloss difference, further accounting an interference-level-over-thermal difference between the time-division-duplex carrier and the frequency-division-duplex carrier.

15. An apparatus, comprising:
at least one processor; and
at least one memory including computer program code,
the at least one memory and the computer program code configured, with the at least one processor, to cause the apparatus at least to
predict a link quality;
determine a primary cell for a user equipment based on the predicted link quality, wherein the determining the primary cell comprises determining whether the user equipment should be served by a time-division-duplex carrier or by a frequency-division-duplex carrier; and
determine a carrier aggregation to be used by the user equipment based on the predicted link quality,
wherein the predicting the link quality comprises determining a reliability of time-division-duplex downlink and a reliability of time-division-duplex uplink,
wherein
if both time-division-duplex downlink and time-division-duplex uplink are determined to be reliable, then the user equipment is determined to be served by the time-division-duplex carrier, and the user equipment is determined to use time-division-duplex-only carrier aggregation, and
if time-division-duplex downlink is determined to be reliable and time-division-duplex uplink is determined to be unreliable, then the user equipment is determined to be served by the frequency-division-duplex carrier, and the user equipment is determined to use frequency-division-duplex-and-time-division-duplex carrier aggregation.

16. A computer program product embodied on a non-transitory computer readable medium, the computer program product configured to control a processor to perform a process, comprising:
predicting a link quality;
determining a primary cell for a user equipment based on the predicted link quality, wherein the determining the primary cell comprises determining whether the user equipment should be served by a time-division-duplex carrier or by a frequency-division-duplex carrier;
determining a carrier aggregation to be used by the user equipment based on the predicted link quality; and
determining an uplink capacity corresponding to a total bandwidth or a spectrum availability,
wherein the determining the primary cell further comprises determining the primary cell based on the uplink capacity,
wherein the determining the carrier aggregation further comprises determining the carrier aggregation based on the uplink capacity, and
wherein the predicting the link quality comprises determining a reliability of time-division-duplex downlink and a reliability of time-division-duplex uplink.

* * * * *